(12) United States Patent
Andersson

(10) Patent No.: US 8,106,812 B2
(45) Date of Patent: Jan. 31, 2012

(54) METHOD AND DEVICE FOR DETECTION OF MOTION OF THE SURFACE OF AN OBJECT

(75) Inventor: Daniel Andersson, Valbo (SE)

(73) Assignee: Radarbolaget I Gävle AB, Gävle (SE)

( * ) Notice: Subject to any disclaimer, the term of this patent is extended or adjusted under 35 U.S.C. 154(b) by 192 days.

(21) Appl. No.: 12/518,478

(22) PCT Filed: Dec. 13, 2007

(86) PCT No.: PCT/SE2007/050991
§ 371 (c)(1),
(2), (4) Date: Jan. 13, 2010

(87) PCT Pub. No.: WO2008/076066
PCT Pub. Date: Jun. 26, 2008

(65) Prior Publication Data
US 2011/0006940 A1    Jan. 13, 2011

(30) Foreign Application Priority Data
Dec. 19, 2006    (SE) ...................................... 0602749

(51) Int. Cl.
*G01S 13/00*    (2006.01)
(52) U.S. Cl. ............................................. 342/28; 342/22
(58) Field of Classification Search .................... 342/22, 342/28, 124
See application file for complete search history.

(56) References Cited

U.S. PATENT DOCUMENTS

| | | | |
|---|---|---|---|
| 4,837,574 A * | 6/1989 | Hill | 342/27 |
| 4,973,966 A * | 11/1990 | Zeewy | 342/61 |
| 5,043,735 A * | 8/1991 | Mawhinney et al. | 342/124 |
| 5,585,799 A * | 12/1996 | Yankielun et al. | 342/115 |
| 5,854,603 A * | 12/1998 | Heger | 342/85 |
| 5,900,833 A * | 5/1999 | Sunlin et al. | 342/22 |
| 6,272,441 B1 * | 8/2001 | Peyerl et al. | 702/112 |
| 6,324,912 B1 * | 12/2001 | Wooh | 73/629 |
| 6,366,232 B1 * | 4/2002 | Liedtke et al. | 342/22 |
| 6,535,141 B1 * | 3/2003 | Doherty | 340/905 |
| 6,538,578 B1 * | 3/2003 | Doherty | 340/905 |
| 6,552,336 B1 * | 4/2003 | Lloyd et al. | 850/15 |
| 6,621,448 B1 * | 9/2003 | Lasky et al. | 342/22 |
| 6,700,528 B2 * | 3/2004 | Williams et al. | 342/28 |
| 6,970,125 B2 * | 11/2005 | Cesura et al. | 341/161 |
| 6,970,128 B1 | 11/2005 | Dwelly et al. | |
| 7,034,740 B2 * | 4/2006 | Witten | 342/22 |

(Continued)

FOREIGN PATENT DOCUMENTS

GB    2 343 805 A    5/2000

*Primary Examiner* — Thomas Tarcza
*Assistant Examiner* — Peter Bythrow
(74) *Attorney, Agent, or Firm* — Browdy and Neimark, PLLC

(57) ABSTRACT

The invention relates to a method for detection of motion of the surface of an object by means of a detection device, the object being stationary during a detection process, and situated in a space on the opposite side of a wall in relation to the detection device, and having a relative dielectric constant $\epsilon r$ greater than 1.1. The method comprises steps of transmitting radar signals and receiving radar signals reflected by the object, and if a motion has been detected, in addition visualising the motion in a three-dimensional combined radar model and data model. The invention also relates to a detection device for carrying out the method.

8 Claims, 8 Drawing Sheets

U.S. PATENT DOCUMENTS

Figure 1:
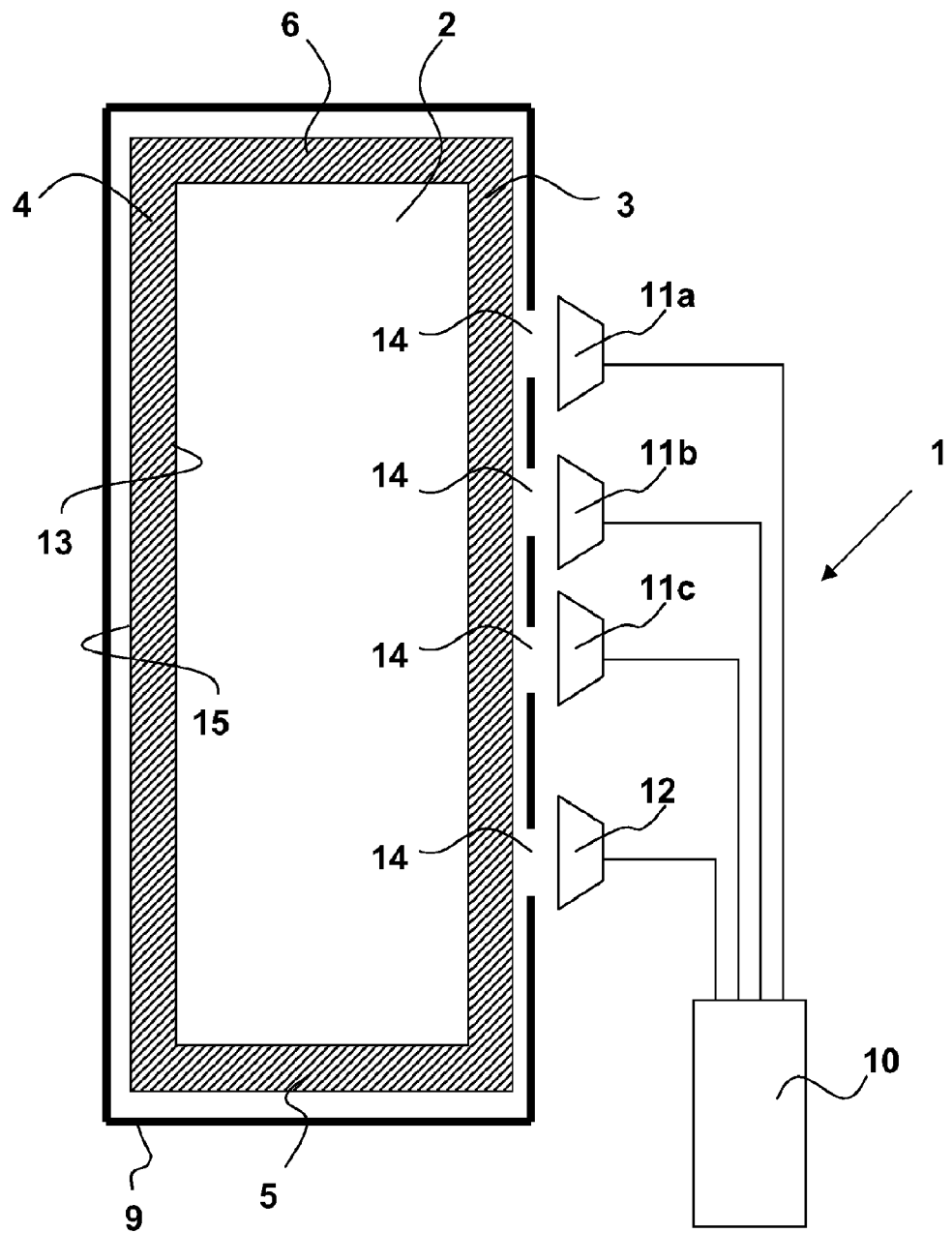

| | | | |
|---|---|---|---|
| 7,190,302 B2 * | 3/2007 | Biggs | 342/22 |
| 7,205,769 B2 * | 4/2007 | Fujiwara | 324/337 |
| 7,265,709 B2 * | 9/2007 | Fleisher et al. | 342/22 |
| 7,310,060 B2 * | 12/2007 | Stilwell et al. | 342/22 |
| 7,541,969 B2 * | 6/2009 | Åkerstrom et al. | 342/124 |
| 2002/0109624 A1 * | 8/2002 | Schutz et al. | 342/28 |
| 2002/0145570 A1 * | 10/2002 | Barnes et al. | 343/824 |
| 2003/0034912 A1 * | 2/2003 | Williams et al. | 342/28 |
| 2006/0152404 A1 * | 7/2006 | Fullerton et al. | 342/28 |

* cited by examiner

Relative
Amplitude

Time units

Relative
Amplitude

Time units

Relative Amplitude

Time units

Relative Amplitude

Time units

METHOD AND DEVICE FOR DETECTION OF MOTION OF THE SURFACE OF AN OBJECT

TECHNICAL FIELD OF THE INVENTION

The present invention relates to a method for detection of motion of the surface of an object by means of a detection device, the object being stationary during a detection process, and situated in a space on the opposite side of a non-transparent wall in relation to the detection device, and having a relative dielectric constant $\epsilon_r$ greater than 1.1. The invention also relates to a detection device for carrying out said method. In particular, the present invention relates to a method for detection of motion of, for instance, the walls/ceiling in a closed process space, such as an industrial furnace.

BACKGROUND OF THE INVENTION AND PRIOR ART

When monitoring walls, ceilings and floors in spaces with extreme conditions, what relates to temperature, humidity, etc., it is not advisable or even possible to place monitoring or measuring equipment in the space itself. The risk of the equipment immediately becoming destroyed or the service life thereof being considerably shortened is very substantial. Conceivable extreme conditions may, for instance, be extreme cold, very strong heat, very high pressures, high air humidity, chemically corrosive substances, other environments not suitable neither for people nor for equipment, and/or a combination of any of the aforementioned environment conditions. Such spaces are usually delimited by non-transparent walls, which makes the monitoring even more difficult.

A closely related technical field and/or solution consist, among other things, of detection and identification of deployed land and anti-personal mines. Here radar technology is used, wherein one or two transmitters transmit signals whereupon a receiver receives the signals reflected by miscellaneous objects in the ground, down to a depth of a meter or so in the ground. An expert has subsequently to study a mapping of the reflected signals and detect, or rather identify, deviations from a common homogeneous volume of sand, soil, clay, stone, etc. However, disadvantages of this method are that the exact location or depth of the feared mine is unknown, and furthermore, the structure and characteristic features of the ground are changed continuously, which makes the detection even more difficult.

Another closely related technical field is monitoring of closed, not accessible spaces, such as military bunkers or demolished houses, in order to detect whether there are persons therein. Also here, radar technology is used, wherein one or two transmitters transmit signals whereupon a receiver receives the signals reflected by miscellaneous objects behind the non-transparent wall. An expert has subsequently to study a mapping of the reflected signals and identify characteristic radar echoes pertaining to a human being. However, the design of the space and the placement of the walls are unknown and are also regarded as unessential in such an operation.

SUMMARY OF THE INVENTION

The present invention aims at obviating the above-mentioned disadvantages of previously known methods for detection of motion of the surface of a non-visible object, and at providing an improved method. A primary object of the invention is to provide a method, which in a clear way visualises motions of the surface of the object in question. This entails that an operator upon the slightest suggestion of motion exactly knows where and how much the surface of the object has moved, in order to be able to plan for repair and shutdown, which, if they are unplanned and immediate, are very expensive.

According to the invention, the object is attained by means of the method defined by way of introduction comprising the features defined in the independent claim 1. According to a second aspect, the invention relates to a detection device for detection of motion of the surface of an object non-visible to the detection device.

Thus, according to the present invention, a method is provided of the type defined by way of introduction, which is characterized by the steps of, generating a data model of the object and the above-mentioned space, which data model is stored in a central processing unit comprised in the detection device, transmitting radar signals in the form of radar pulses, the frequency components of which are distributed within the frequency range of 30 MHz-12,4 GHz, receiving reflected radar signals generated at reflection points consisting of dielectric steps when the radar signals pass into and out of, respectively, the object, comparing the received reflected radar signals with the transmitted radar signals in order to obtain correlation results, each of which communicates a distance between two known positions via said reflection points, difference analyzing different correlation results obtained over time in order to detect a motion of a specific reflection point of the surface, by means of difference analyses of correlation results belonging to at least three mutually separated sets of two known positions unambiguously determining the location of the specific moved reflection point, creating a radar model of the motion of the surface of the object, and visualising the radar model in the above-mentioned data model.

Preferred embodiments of the inventive method and detection device are further seen in the dependent claims, as well as the subsequent, detailed description of preferred embodiments.

Thus, the fundamental problem that is sought to be solved is to monitor or measure the condition of the walls in a space, preferably an industrial process space, such as a furnace in a steelworks, which is exposed to particularly extreme conditions. Conceivable extreme conditions may, for instance, be extreme cold, very strong heat, very high pressures, high air humidity, chemically corrosive substances, or other environments not suitable neither for people nor for equipment, and/or a combination of any of the aforementioned environmental condition. The above-mentioned monitoring is desired to be continuous also when the process is in operation, which rules out the possibility of making checks when no operation takes place in the space. By placing the monitoring equipment outside the space and checking the object by allowing radar signals to propagate from a transmitter through the wall of the space against the object and be reflected back through said wall to a receiver, the monitoring equipment will in such a way be entirely protected since no part is in the extreme environment.

According to the present invention, the position is known for the object that is to be monitored and in addition, the entire space being monitored can also be regarded as stationary, both before and after the motion that triggered the detection. By means of the invention, motions of a surface of the object can be detected, which may be visualised in a three-dimensional data model of the space being monitored. The monitoring may take place continuously and if some detectable motion occurs, an automatic alarm may be activated.

BRIEF DESCRIPTION OF THE APPENDED DRAWINGS

Figure 2:
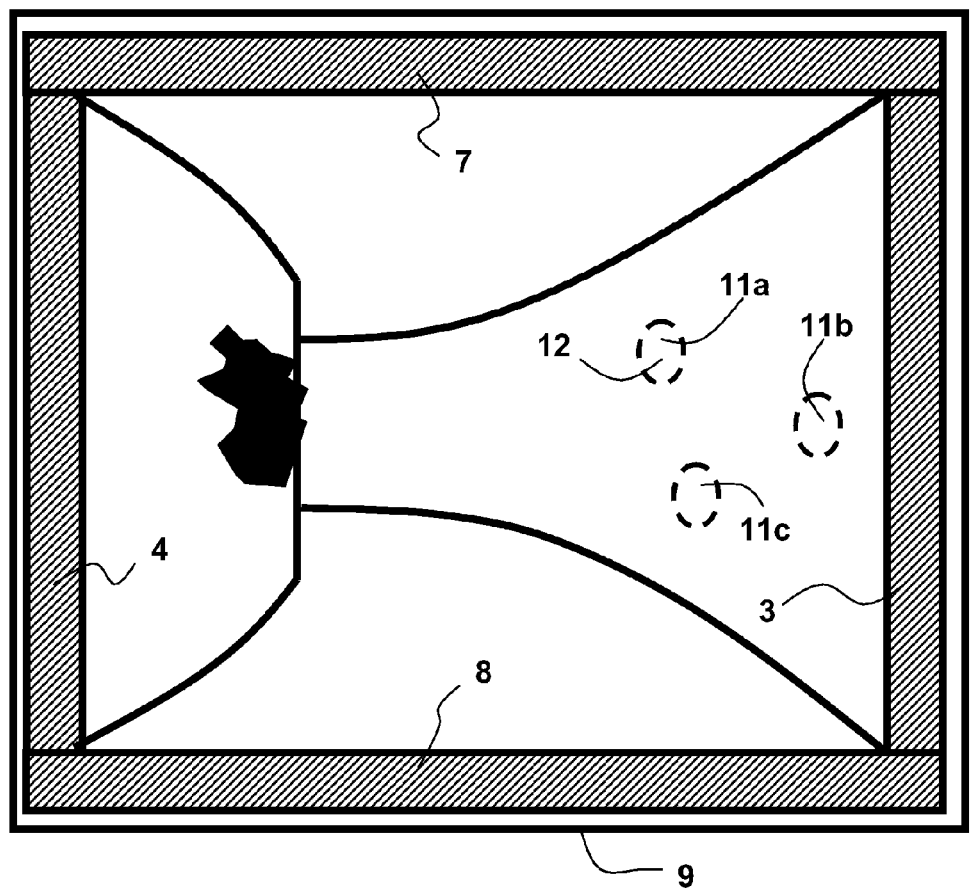
Figure 3:
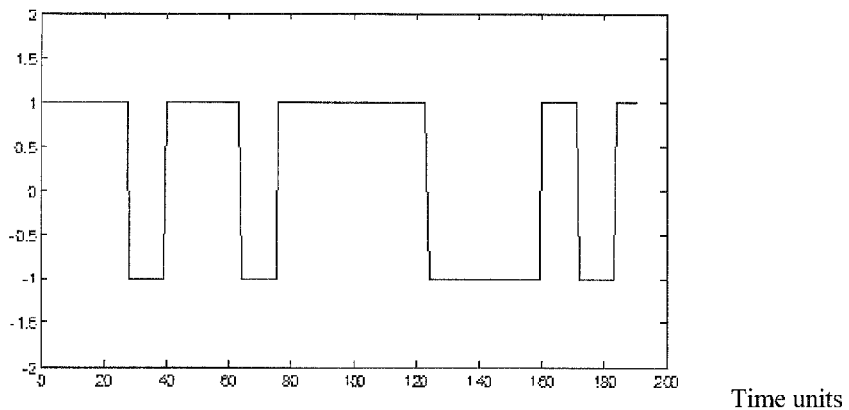
Figure 4:
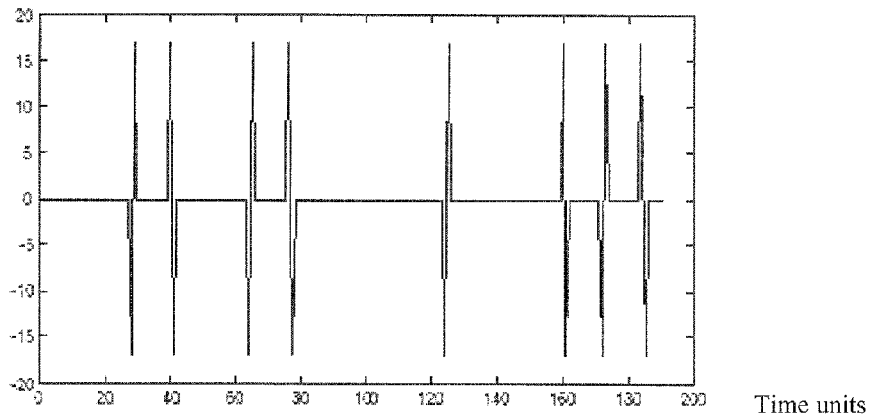
Figure 5:
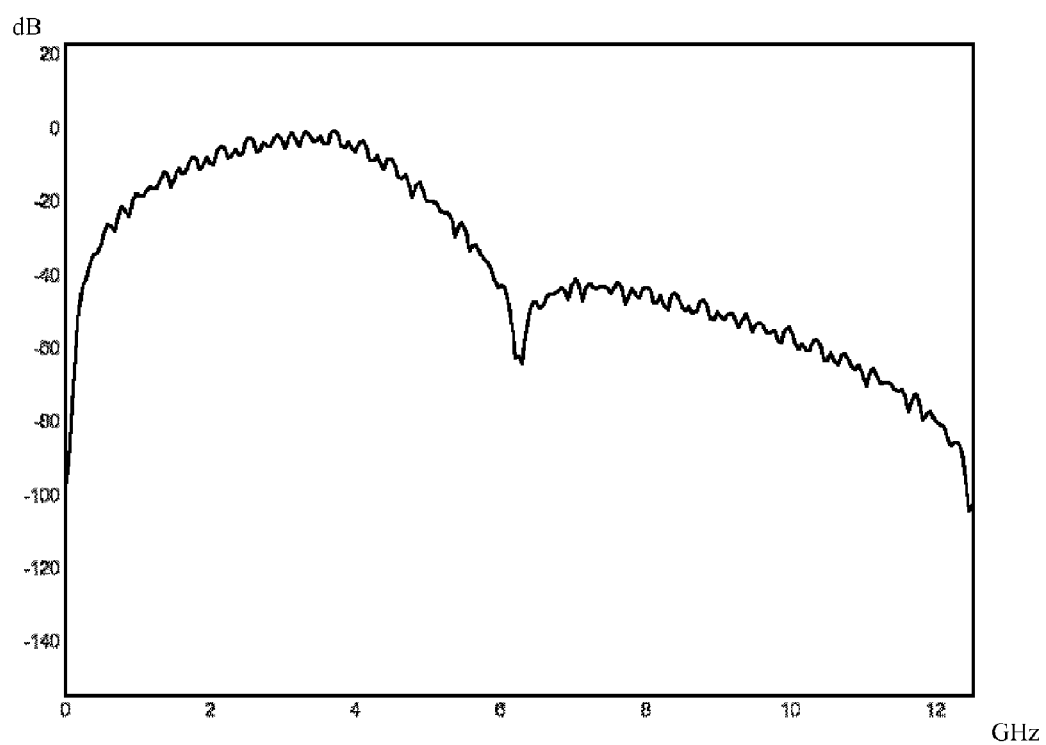
Figure 6:
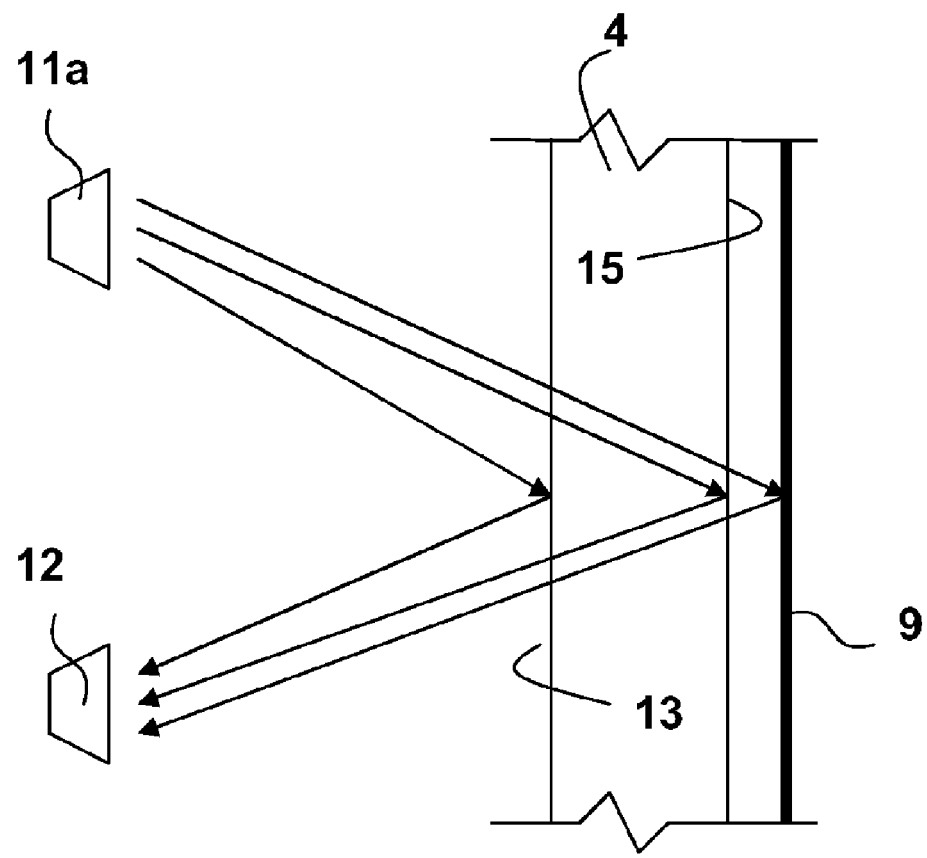
Figure 7:
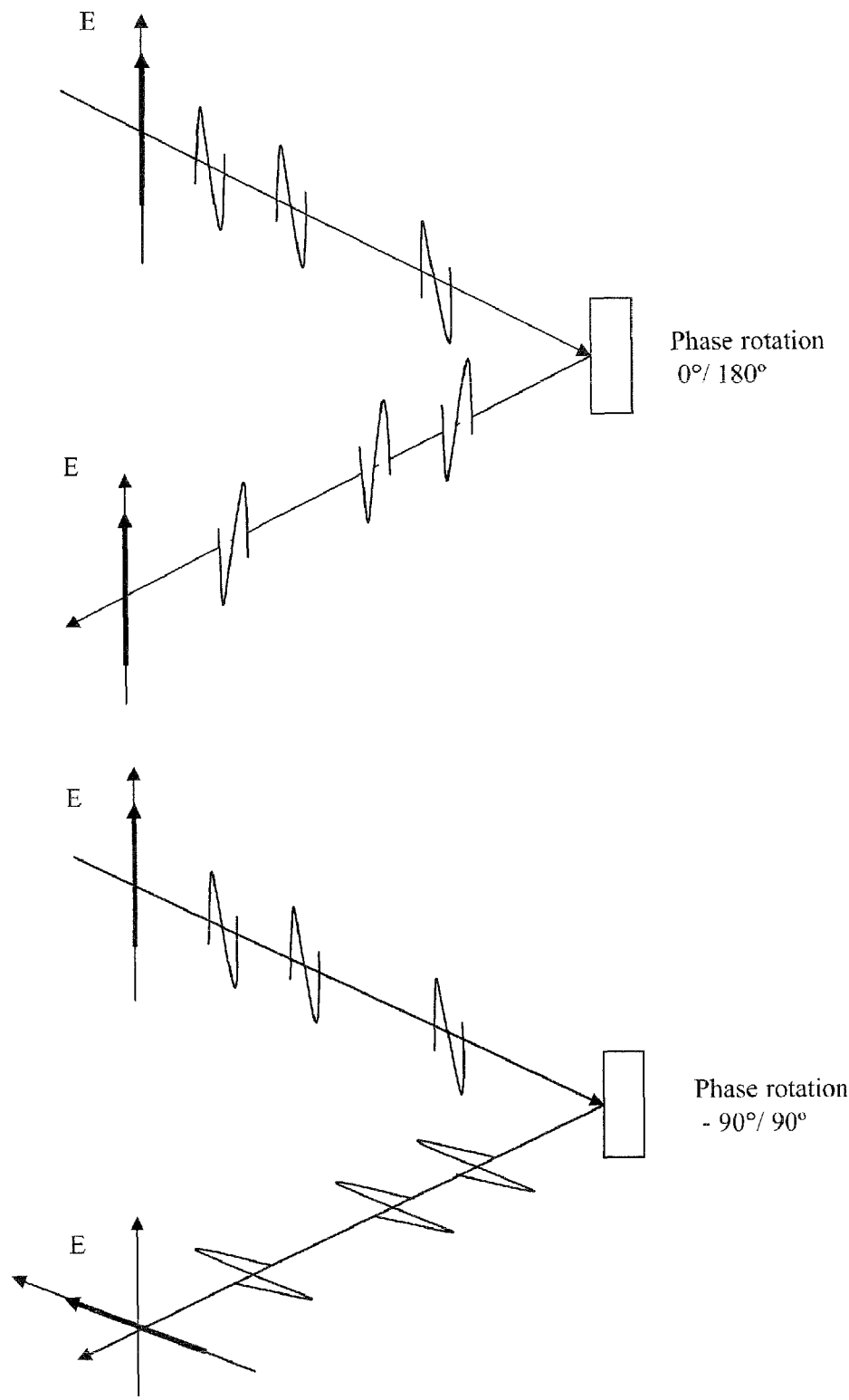
Figure 8:
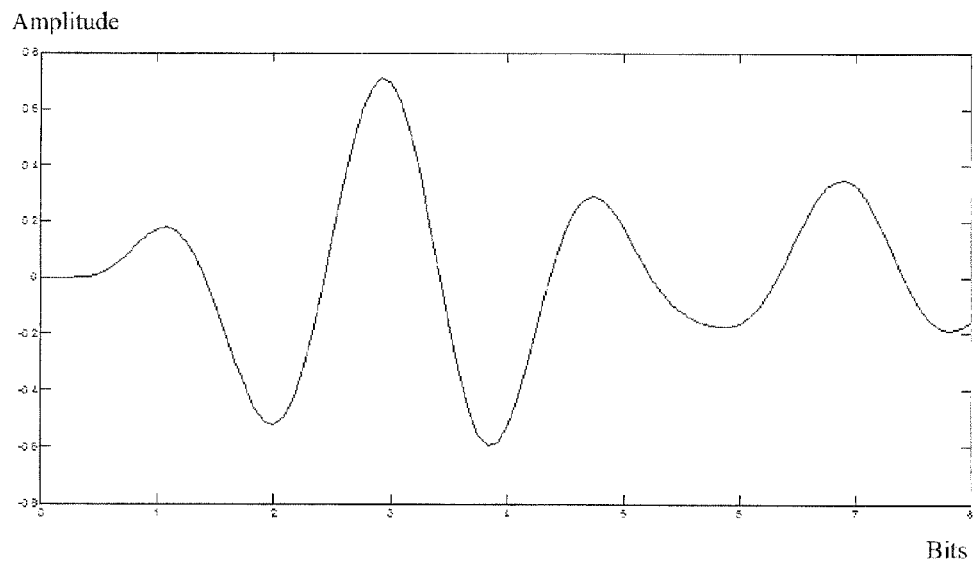
Figure 9:
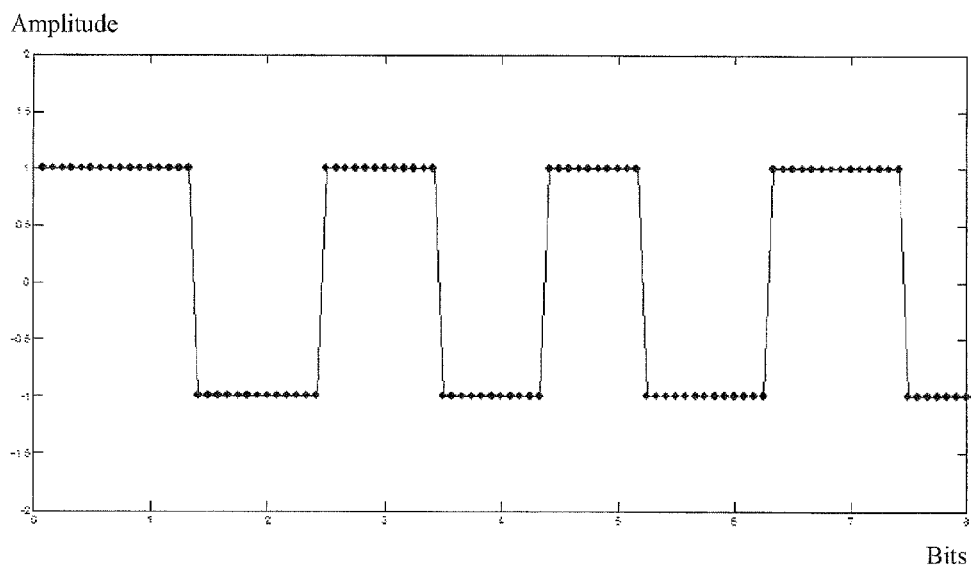
Figure 10:
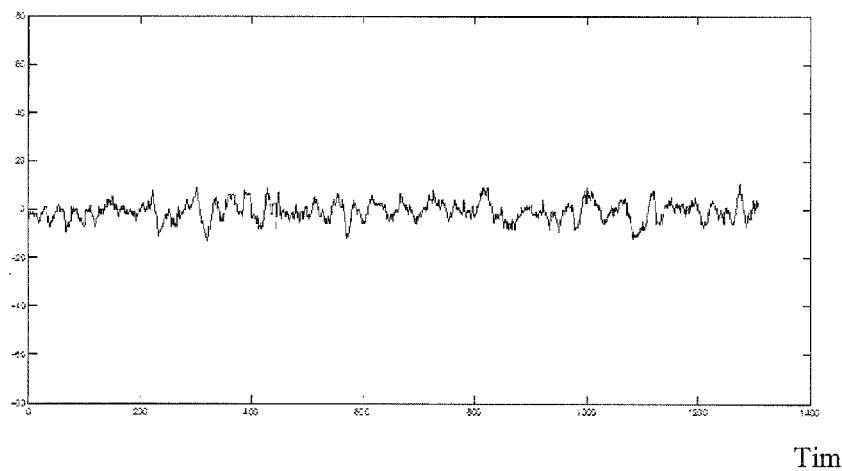
Figure 11:
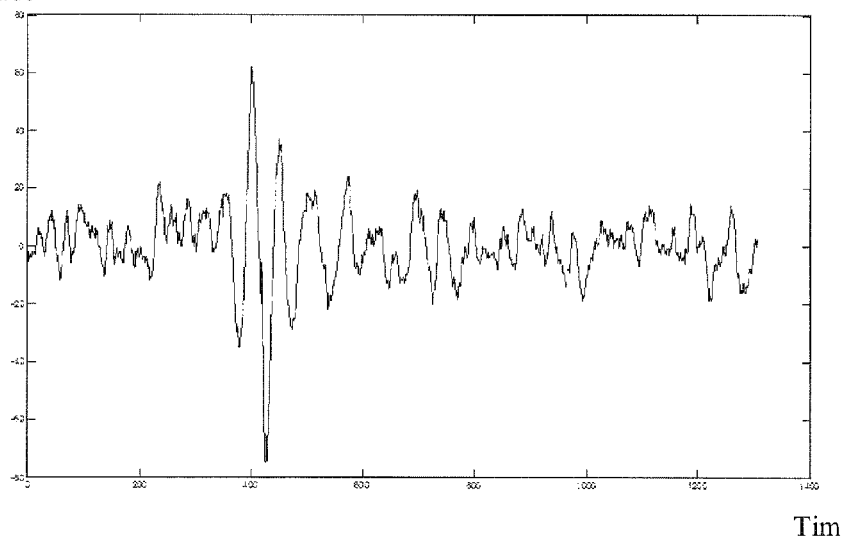

A more complete understanding of the above-mentioned and other features and advantages of the present invention will be clear from the following, detailed description of preferred embodiments in connection with the accompanying drawings, wherein:

FIG. 1 is a schematic view from above of the detection device according to the invention, the object that is to be detected and the space in which the object is situated, FIG. 2 is a schematic three-dimensional visualisation of the data model of the space, in which a motion of the surface of the rear wall is detected and represented by a radar model that is placed in the data model, FIG. 3 shows a part of a code sequence that is sent to each transmitter from the central unit, FIG. 4 shows a part of the radar signal transmitted from each of the transmitters, based on the code sequence according to FIG. 3, FIG. 5 shows the spectral distribution of the radar signal that is formed when the code sequence according to FIG. 3 is transmitted, FIG. 6 is a schematic illustration that shows that reflected radar signals are generated at reflection points consisting of dielectric steps when the transmitted radar signals pass into and out of, respectively, objects, FIG. 7 shows how the polarization of the radar signals is affected upon reflection against object surfaces, FIG. 8 shows a representation of a reflected radar signal received by the receiver, FIG. 9 shows a representation of the interpretation by the receiver of the received reflected radar signal in FIG. 8, FIG. 10 shows a zero difference detection in the form of a noise distributed evenly over time, which is obtained when no motion has been detected, and FIG. 11 shows a difference detection, which is obtained when a motion of the surface of the object being monitored has been detected.

DETAILED DESCRIPTION OF PREFERRED EMBODIMENTS

In FIG. 1, a schematic representation is shown of the detection device according to the invention, generally designated 1, which is arranged close by a space 2, which, for instance, consists of an industrial furnace. The space 2 comprises and is limited by a shell, and as viewed from the detection device 1, the shell in the embodiment shown consists of a front wall 3, a rear wall 4, first and second side walls 5, 6, a top 7 (see FIG. 2) and a floor 8 (see FIG. 2). In the case of a furnace, the shell preferably consists of heat-resistant bricks, which externally are covered with metal sheets 9.

The detection device 1, according to a preferred embodiment, comprises a central processing unit 10, at least three transmitters 11a-c and a receiver 12. The three transmitters 11a-c and the receiver 12 are operatively connected to the central unit 10. It should be pointed out that the central unit 10 also may comprise a freestanding computer (not shown) operatively connected to other parts of the detection device 1, for storage, processing and treatment of information. The detection device 1 is preferably of ultra-wide band radar technology type (UWB) and is arranged to detect motions in the surface of an object, which in the shown embodiment example consists of the above-mentioned shell, and which has a relative dielectric constant $\epsilon_r$ greater than 1.1, and which is regarded to be stationary during the detection process, i.e., during the time measuring is in progress. This entails that the possible natural motion of the monitored object is so small that it is not detectable during the time that the detection process is in progress to decide whether a detected motion of the surface of the object has occurred. In a following example, the time for the detection process is estimated to 30 s, which in turn limits the speed of the natural motion of the object to 10 μm/s.

In the shown embodiment example, the object according to the invention consists of the front wall 3, the rear wall 4, the first and the second side walls 5, 6, respectively, the top 7 and the floor 8, and the surfaces being monitored are above all those facing inward toward the space 2. Should a wall give way, also the rear surface facing away from the space 2 would probably also move. However, it should be pointed out that the object may be a, at least during the measurement, stationary and freestanding object situated in said space 2.

Hereinafter, it is assumed that the object consists of the rear wall 4 and the surface of the object consists of the surface 13 of the rear wall 4 facing inward toward the space 2. The detection device 1 is situated on the opposite side of the front wall 3 in relation to the object 4. In the metal sheet 9, a number of holes 14 are recessed, the transmitters 11a-c and the receiver 12 being placed at a hole 14 each, so that radar signals can propagate into and out of, respectively, the space 2. It should be pointed out that one transmitter 11a and the receiver 12 may be arranged in one and the same opening 14, which is the case in FIG. 2 where two of the dashed rings illustrate a transmitter 11b-c each and the third dashed ring illustrates a combined transmitter 11a and receiver 12. It should be pointed out that each dashed ring may consist of units that comprise a combined transmitter and receiver. In order to obtain an unambiguously determined location of a reflection point by means of three distances, each of which is between two known positions (11a-c, 12) via at least one reflection point, which distances belong to three mutually separated sets of two known positions, it is important that the transmitters 11a-c and the receiver 12 are not located along a straight line, instead the mutual placement of the transmitters 11a-c and of the receiver 12 should, for instance, form a triangle.

A first step is to create a data model of the space 2 and the object 4. This may, for instance, be effected by laser scanning of the space or programming of the space based on drawings, whereupon the data model is stored in the central unit 10.

In the central processing unit 10 of the detection device 1, a binary code sequence is generated, which has an unambiguously correlation result, a part of which code sequence is illustrated in FIG. 3 and the length of which determines the system gain of the detection device 1. The system gain depends on the length of the code sequence, and a longer code sequence gives a higher system gain. The relation is linear so that a doubling of the length of the code sequence gives a doubling of the system gain. However, with a longer code sequence, simultaneously the time it takes for a code sequence to be transmitted and received is extended, which sets an upper limit for how long code sequences that are appropriate to use. For instance, the length of the code sequence may be 640 or 1280 bits.

The code sequence is continuously repeated, and is fed, for instance, via a fibre-optic link to the transmitters 11a-c. The choice of fibre optics is motivated by the fact that the code sequence must not be distorted or disturbed on the way between the central unit 10 and the transmitters 11a-c.

The transmitters 11*a-c* transmit a radar signal comprising short radar pulses caused by the amplitude change of the code sequence at the transition from one state to another (see FIG. 4). For instance, the radar pulses in the electric field of the transmitters 11*a-c* may be related to the second order derivative of the code sequence. The spectral distribution of the radar signal illustrated in FIG. 5 is controlled by the bit rate of the code sequence as well as by the structure of the binary code sequence. In doing so, the spectral distribution of the radar signal is formed so that it conforms with a so-called frequency mask issued by ETSI (European Telecommunications Standards Institute), i.e., set of allowable transmission powers at different frequencies. The radar signal is time-division multiplexed, i.e., that each transmitter 11*a-c* is assigned a time window for the respective transmission thereof, by the fact that the code sequence is transmitted a large number of times during 10 s or 65 billion bits from the first transmitter 11*a*. Next, the second transmitter 11*b* is switched in and the transmission is repeated. Next, the third transmitter 11*c* is switched in and the transmission is repeated again, which concludes a detection process, and then the first transmitter 11*a* is activated anew.

The wave front of the radar signal propagates in the space 2 and through the object 4, and a part of the radar signal is reflected by the front surface 13 of the object 4, the rear surface 15 of the object 4, and by the metal sheet 9, respectively, and propagates back to the receiver 12, such as illustrated in FIG. 6. The radar signal is reflected in two instances, both when the relative dielectric constant $\epsilon$ of the medium in which the radar signal travels is abruptly altered, and when the wave front reaches a metal surface. In the case when the reflection depends on abrupt alterations of the dielectric properties of the medium, such as when the transmitted radar signal passes into and out of, respectively, the object 4, the direction of polarization of the radar signal wave may rotate and the reflected radar signal wave gets a polarization that deviates from the incident radar signal wave. The rotation depends, for instance, on the positioning of the geometry of and/or material properties of the medium and can therefore not be predicted but has to be regarded as more or less random. When the reflection takes place against a metal surface, such as the metal sheet 9, the rotation of the direction of polarization of the radar signal wave will be more unambiguous, however also in this case, the same may vary somewhat, depending, for instance, on the properties, geometry and surface structure of the metal surface. This implies that the receiver 12 has to be able to handle reflected radar signals irrespective of the direction of polarization of the reflected radar signal. Hence, the receiver 12 is circularly polarized in order to capture reflected radar signals at full signal level irrespective of the polarization of the reflected radar signal. Simultaneously, the receiver 12 is constructed to handle radar signals that changes polarization between 0° and 180°, depending on the detection device 1 in this respect not being unambiguous (see FIG. 7).

Transmission lines from the receiver 12 to the central unit 10 should preferably have a large bandwidth in order not to distort the wave front of the radar signal. Preferably, broadband fibre-optic links are used for transmission between the receiver 12 and the central unit 10.

In the central unit 10, the transmitted radar signal is compared with the received reflected radar signal, or in other words, the structure/appearance of the transmitted code sequence is compared with the structure/appearance of the interpretation of the received reflected radar signal. The correlator is symmetrical, which also means that a comparison of a complementary radar signal is carried out, in order to obtain a more unambiguous correlation result. FIG. 8 shows a reflected radar signal received by the receiver 12. FIG. 9 shows the interpretation by the receiver 12 of the reflected radar signal in FIG. 8.

A correlator (not shown) comprised in the detection device 1 compares all bits of the transmitted code sequence with the corresponding parts of the interpretation of the received reflected radar signal, and reports in a correlation result how many bits that are in agreement. The result is normalized and each comparison results in a number in the interval of −1 to +1. Results near −1 or +1 indicate a good agreement between the transmitted radar signal and the received reflected radar signal, and the value of all comparisons with at least a certain agreement are summed up to form a point in a correlation result. Next, the transmitted code sequence and the interpretation of the received reflected radar signal are moved in relation to each other a predetermined distance, for instance a bit or, for instance, in steps of 1/12 of a bit to obtain smoother transitions and higher accuracy of the correlation result. Thus, preferably the operation is repeated for all bits with so-called 12 bits oversampling, until the cyclic code sequence has been moved "a full revolution". The time elapsed to a point that constitutes a marked peak in the correlation result corresponds to the time elapsed from the transmission of the radar signal to the receipt of the radar signal that has been reflected by a reflection point.

By means of the correlator, a comparison of a time interval from 0 to 100 ns is effected. In free space, this corresponds to a radar distance of 0-15 m, which is equal to the distance between the transmitter 11*a-c* and the receiver 12 via a reflection point. In the present embodiment, the radar distance accuracy for individual reflection points of an object in free space will be approx. 4 mm, and the resolution between two different reflection points approx. 92 mm in free space. In other words, reflection points that are closer to each other than 92 mm in line away from the receiver 12 will not certainly be distinguishable from each other. However, it should be pointed out that since the resolution between two reflection points implies that the radar signal propagates through a dielectric material, the resolution is improved by $1/(\epsilon_r)^{1/2}$. The ratio $1/(\epsilon_r)^{1/2}$ is a measure of how much the speed of the radar signal is reduced when it propagates through a dielectric material. For, for instance, a certain type of bricks having a relative dielectric constant of $\epsilon_r$=3.5, the resolution between two reflection points will be approx. 50 mm. By transmitting the radar signal from at least three transmitter positions and combine the established radar distances from the respective transmitter position, a three-dimensional radar model can describe the space 2 being monitored, i.e., each reflection point is unambiguously determined by means of three distances, each of which is between two known positions (11*a-c*, 12) via said reflection point, which distances belong to three mutually separated sets of two known positions.

If the industrial process undertaken in the space 2 runs continuously, the detection device 1 has access to a reference radar model that describes the state in the space 2 that is regarded as normal. The reference radar model consists of an "average result" of a plurality of correlation results. If a change arises in the radar model, the last normal reference radar model is stored and a difference analysis is carried out by means of a difference detector (not shown) comprised in the detection device 1. Thus, the purpose of the difference analysis is to compare a plurality of correlation results obtained over time in order to be able to detect deviations. Said difference analysis resembles filtering of clutter when using a surveillance radar.

In the normal state where no changes of the correlation result arise, the difference detector provides a zero difference detection in the form of a noise evenly distributed over time (see FIG. 10). However, if a motion of the surface 13 of the object 4 has occurred, the difference detector records a pronounced difference and provides a difference detection (see FIG. 11). Such a difference may, for instance, arise by a part of the surface 13 of the object 4 being displaced forward toward the detection device 1. A strong pulse oscillation from the difference detector indirectly marks the distance from the transmitter 11a-c to the receiver 12 via the point where the event has occurred, the distance is shown in seconds and knowing the propagation speed of the radar signal in different media, the distance can be read. FIG. 10 shows zero difference detection based on the transmission from the first transmitter 11a, and FIG. 11 shows difference detection based on the transmission from the first transmitter 11a.

The exact location of the reflection point is identified, by proceeding from difference detections based on the respective of the three transmitters 11a-c, in a three-dimensional radar model and is placed in the three-dimensional laser-scanned data model of the object 4 and the space 2, in order to establish that it is the object 4 that has moved and not something else in the space 2.

The three-dimensional radar model from the detection device 1 has to be corrected by means of pre-established calibration data to fit into the laser-scanned data model of the space 2. This is due to the radar signal propagating through materials having different dielectric properties and thereby propagating by different speeds. By the correction, the three-dimensional radar model and the laser-scanned data model of the space can be brought to correspond. In FIG. 2, there are shown the space 2 being monitored as well as the motion that has occurred. In this case, a deformed part of the rear wall 4 has been simulated. The picture also shows the placement of the three transmitters 11a-c and of the receiver 12 behind the front wall 3.

The detection device 1 provides the possibility of continuously monitoring the space 2 and giving automatic alarms if motions are detected. Desired motions and changes in other locations in the space, for instance motions of products processed in the space, can by virtue of their detected positions be screened away or, if desired, be signal processed in a separate process.

FEASIBLE MODIFICATIONS OF THE INVENTION

The invention is not limited only to the embodiments described above and shown in the drawings. Thus, the detection device and the detection process may be modified in all feasible ways within the scope of the accompanying claims.

It should be pointed out that instead of using three transmitters and one receiver, three receivers and one transmitter may be used to achieve the same result, namely at least three distances, each between two known positions via at least one reflection point, belonging to three mutually separated sets of two known positions. Moreover, two receivers and two transmitters may be used. In a preferred embodiment, three transmitters and three receivers may be used, which are arranged in pairs containing one transmitter and one receiver. Each pair is arranged in a hole in the metal sheet, whereupon six distances, each between two known positions via reflection points, can be obtained, which increases the accuracy and the precision of the detection device.

The invention claimed is:

1. A method for detection of motion of the surface (13) of an object (4) by means of a detection device (1), the object (4) being stationary during a detection process, and situated in a space (2) on the opposite side of a wall (3) in relation to the detection device (1), and having a relative dielectric constant $\epsilon_r$ greater than 1.1, the method is characterized by the steps of:
   a) generating a data model of the object (4) and the above-mentioned space (2), which data model is stored in a central processing unit (10) comprised in the detection device (1),
   b) transmitting radar signals in the form of radar pulses, the frequency components of which are distributed within the frequency range of 30 MHz-12,4 GHz,
   c) receiving reflected radar signals generated at reflection points consisting of dielectric steps when the radar signals pass into and out of, respectively, the object (4),
   d) comparing the received reflected radar signals with the transmitted radar signals in order to obtain correlation results, each of which communicates distances between two known positions (11a-c, 12) via said reflection points,
   e) difference analyzing different correlation results obtained over time in order to detect a motion of a specific reflection point of the surface (13),
   f) by means of difference analyses of correlation results belonging to at least three mutually separated sets of two known positions (11a-c, 12) unambiguously determining the location of the specific moved reflection point,
   g) creating a radar model of the motion of the surface (13) of the object (4), and visualising the radar model in the above-mentioned data model.

2. Method according to claim 1, characterized by the step of revising the distance, communicated from correlation results, between two known positions (11a-c, 12) via said reflection points, considering the fact that the transmitted and received, respectively, radar signals propagate through the wall (3) that separates the detection device (1) and the object (4) and that has a relative dielectric constant $\epsilon_r$ greater than 1.1.

3. Method according to claim 1, characterized in that the radio waves transmitted in the form of pulses consist of a binary cyclic code sequence that has an unambiguously correlation result.

4. Method according to claim 1, characterized in that the radar signals are transmitted from at least three transmitters (11a-c) comprised in the detection device (1), and the reflected radar signals are received by one receiver (12) comprised in the detection device (1).

5. Method according to claim 1, characterized in that the radar signals are transmitted from one transmitter (11a-c) comprised in the detection device (1), and the reflected radar signals are received by at least three receivers (12) comprised in the detection device (1).

6. A detection device (1) for detection of motion of the surface (13) of an object (4), which is stationary during a detection process, and which is situated in a space (2) on the opposite side of a wall (3) in relation to said detection device (1), and which has a relative dielectric constant $\epsilon_r$ greater than 1.1, characterized in that the same comprises a central processing unit (10) in which a data model of the object and the above-mentioned space (2) is stored, means (11a-c) to transmit radar signals in the form of pulses, the frequency components of which are distributed within the frequency range of 30 MHz-12,4 GHz, means (12) to receive reflected radar signals generated at reflection points consisting of dielectric steps when the radar signals pass into and out of, respectively, the object (4), means to compare the reflected radar signals with the transmitted radar signals in order to obtain correlation results, each of which communicates a distance between two known positions (11*a-c*, 12) via said reflection points, means to difference analyze different correlation results obtained over time in order to detect a motion of at least one specific reflection point of the surface (13), means to unambiguously determine the location of the specific moved reflection point based on difference analyses of correlation results belonging to at least three mutually separated sets of two known positions (11*a-c*, 12), means to create a radar model of a detected motion of the surface (13) of the object (4), and means to visualise the radar model in the above-mentioned data model.

7. Detection device according to claim 6, characterized in that the same comprises at least three transmitters (11*a-c*) arranged to transmit the radar signals, and one receiver (12) arranged to receive the reflected radar signals.

8. Detection device according to claim 6, characterized in that the same comprises one transmitter (11*a-c*) arranged to transmit the radar signals, and at least three receivers (12) arranged to receive the reflected radar signals.

\* \* \* \* \*